United States Patent [19]

Coyle, Jr. et al.

[11] Patent Number: 4,957,002

[45] Date of Patent: Sep. 18, 1990

[54] METHOD, SYSTEM AND DEVICE FOR DETERMINING QUALITY OF ASSEMBLY OF TOOL PARTS

[75] Inventors: William E. Coyle, Jr., Houma; Dennis J. Pennison, Raceland, both of La.

[73] Assignee: Bilco Tools, Inc., Houma, La.

[21] Appl. No.: 315,830

[22] Filed: Feb. 27, 1989

[51] Int. Cl.$^5$ .............................................. G01B 7/16
[52] U.S. Cl. ........................................ 73/761; 73/767; 73/862.21
[58] Field of Search ............... 73/761, 862.21, 862.23, 73/862.25, 862.04, 767; 33/787, 788, 789, 790

[56] References Cited

U.S. PATENT DOCUMENTS

| | | |
|---|---|---|
| 1,907,461 | 5/1933 | Sundee . |
| 1,985,916 | 1/1935 | Coates et al. . |
| 2,527,456 | 10/1950 | Schmeling . |
| 2,971,373 | 2/1961 | Heldenbrand . |
| 3,314,156 | 4/1967 | Van Burkleo ................... 73/761 X |
| 3,368,396 | 2/1968 | Van Burkleo et al. . |
| 3,390,575 | 7/1968 | Hukle . |
| 3,492,866 | 2/1970 | Latham et al. . |
| 3,527,094 | 9/1970 | Yew et al. . |
| 3,606,664 | 9/1971 | Weiner . |
| 3,745,820 | 7/1973 | Weiner . |
| 4,091,451 | 5/1978 | Weiner et al. ............... 73/862.23 X |
| 4,176,436 | 12/1979 | McCombs et al. . |
| 4,210,017 | 7/1980 | Motsinger . |
| 4,365,402 | 12/1982 | McCombs et al. . |
| 4,491,021 | 1/1985 | Meline ................................. 73/767 |
| 4,573,359 | 3/1986 | Carstensen ........................... 73/761 |
| 4,607,531 | 8/1986 | Meline et al. ........................ 73/794 |
| 4,700,576 | 10/1987 | Grare et al. .......................... 73/761 |
| 4,738,145 | 4/1988 | Vincent et al. . |

OTHER PUBLICATIONS

Machines & Tooling, vol. XLI, No. 1, Portable Roundness-Tester for Checking Bores in Large Components.

Primary Examiner—Charles A. Ruehl
Attorney, Agent, or Firm—Samuel Meerkreebs

[57] ABSTRACT

A method, system and device for determining the quality of assembly of tool parts involves measurement of the rates of rotation of the tool parts or the torque imposed on the tool parts, or a combination thereof, followed by measurement of axial strain, or torsional strain, or hoop strain, or a combination thereof. The measured data are processed to determine the presence of a shoulder, seizing, seals, extreme hoop pressure, mismatched connections, and the like during assembly of the tool parts, thus assuring quality of assembly. The collected data are plotted versus time and displayed for the operator. The clamping device employed can be a one-part device for measuring hoop strain only, or can be a two-part device for measuring two or more of the aforementioned strain values.

49 Claims, 7 Drawing Sheets

NOTE: TORQUE AND STRAIN CURVES CAN BE RADICALLY DIFFERENT BETWEEN DIFFERENT CONNECTION STYLES

METHOD, SYSTEM AND DEVICE FOR DETERMINING QUALITY OF ASSEMBLY OF TOOL PARTS

TECHNICAL FIELD

The present invention relates to a method, system and device for determining the quality of assembly of tool parts. For example, the method, system and device of the present invention can be utilized to insure proper assembly and/or disassembly of an oil drilling tool.

BACKGROUND ART

Once a borehole has been drilled into the earth for the purpose of penetrating earth formations, pipe strings are run into the borehole in order to facilitate the flow of earth fluids to the surface. Such pipe strings are assembled from pipe string sections, typically having a pin at one end and a box member at the other end, and the pipe sections are run into the borehole as the sections are interconnected.

The interconnection or assembly of the pipe string sections is carried out by the use of a power tong to connect the pin of one section to the box of another. The power tong typically comprises a rotary jaw member for gripping the pipe and a motor for rotating the jaw member until the pipe string sections have been tightened to a desired degree. The joint must be tight enough to prevent leakage while developing high joint strength, but the joint must not be so tight as to damage the threads of either the box member or the pin of the connected pipe sections.

In the past, a number of techniques have been used to determine the amount of torque required to connect the pipe string sections together with the desired degree of tightness. Some techniques have involved measurement of both the torque and the number of revolutions of the pipe string sections by the power tong. For example, see the following U.S. Pat. Nos.: 3,368,396; 3,606,664; 3,745,820; 4,068,189; 4,091,451; 4,176,436; 4,210,017; and 4,365,402.

Other disclosures of general background interest relative to the invention are contained in the following U.S. Pat. Nos.: 1,907,461; 1,985,916; 2,527,456; 2,971,373; 3,390,575; 3,492,866; 3,527,094; and 4,738,145. In addition, the following publication is of general background interest: "Portable Roundness-Tester for Checking Bores in Large Components", *Machines and Tooling*, Volume XLI, No. 1 (1970), pp. 57-58.

Some arrangements and techniques, such as that disclosed in U.S. Pat. No. 4,738,145, employ a torque-only plot in order to interconnect pipe sections. However, such arrangements and technique of the prior art produce inaccurate results under certain conditions, such as when: (1) defects are present in the pipe connections (such defects can be due to damage during manufacture, use, storage or handling; (2) the tubing (typically 30 feet or longer) is bent; (3) the tubing extends for such a length (three sections or ninety feet) so as to cause the threads to carry extra weight and possibly wobble during assembly; (4) wind or derrick misalignment causes pipe misalignment, resulting in inaccurate torque plots; or (5) too much lubricant, too little lubricant or the wrong type of lubricant adversely affecting the torque plot.

In some arrangements of the prior art, strain gauges have been used in many forms and applications. However, other devices such as LVDT devices and the inductance family of linear measuring devices are considered easier to use, depending on the skill of the user. Nevertheless, in light of the devices of the prior art, it is considered desirable to develop a measuring device which provides a strain plot without dimensions and settings being critical to good test results, and which is portable, does not require a great deal of skill to use, does not require that a strain gauge be attached directly to the surface being tested, is easy to calibrate, is relatively inexpensive, and is available in an intrinsically safe embodiment.

Prior to describing the invention, a few definitions should be set forth. The term "stress" is a term used to compare the force applied to a material and the ability of the material to carry the force. Stress cannot be measured directly, and it must be computed from other measurable parameters, one of which is strain.

With respect to the term "strain" when a force is applied to a material and the material deforms, this deformation is called "strain". Strain can be given a value by measuring the deformation of a certain unit of length of the material before a force is applied, and then measuring the deformation of the unit of length after a force is applied. Strain can be either tensile or compressive. Moreover, strain can be measured by various mechanical and electrical methods.

The term "torque" is a unit that measures rotational motion around an axis. It is the product of a force and the moment arm of the force, the moment arm being the perpendicular distance from the axis to the line of action of the force.

Finally, the terms "torsion" or "torsional" refer to the twisting or wrenching of a body by the exertion of forces tending to turn one end or part of the body about a longitudinal axis while the other end is held fast or turned in the opposite direction.

SUMMARY OF THE INVENTION

The invention generally relates to a method, system and device for determining the quality of assembly of tool parts (e.g., oil drilling pipe sections).

Basically, the method and system call for determination of the quality of assembly of tool parts, wherein a first tool part is assembled with a second tool part by rotatably inserting the first tool part into the second tool part to form a tool joint. The method and system of the invention further involve measurement of the rates of rotation of the first and second tool parts relative to each other, or measurement of the torque imposed on the first and second tool parts, or measurement of both the rates of rotation and the torque to obtain a first set of data, coupled with measurement of axial strain, or torsional strain, or hoop strain, or a combination thereof to obtain a second set of data, followed by processing or correlation of the first and second sets of data to determine the quality of assembly of the tool parts.

In accordance with the invention, a specially designed clamping device is easily and quickly attached to one of the tool parts (in the case of an oil drilling pipe, the box portion thereof), and the strain measurement(s) is (are) taken. In the case of two or more strain measurements, preferably, the clamping device is a two-part clamping device. The two parts of the clamping device are separated by a spacer, and are interconnected by means of a tapered screw, tapered retaining bolt, cam, snap-type clamp, or some type of flexible material. A further feature of the clamping device involves the use of inserts for adapting the clamping device for use with different size pipes, such inserts enabling the user to quickly transfer the clamping device from one pipe size to another. Finally, the clamping device of the present invention is highly portable, and has the capability of providing two or more strain readings at a time.

Finally, the invention provides advantages in that a strain gauge does not have to be attached directly to the surface being tested, dimensions and settings are not highly critical for good test results, and the information obtained is immediately useful to determine the quality of the connection.

Therefore, it is a primary object of the present invention to provide a method, system and device for determining the quality of assembly of tool parts.

It is an additional object of the present invention to provide a method, system and device wherein measurement of rotational rates and/or torque is followed by measurement of one or more of axial strain, torsional strain and hoop strain, and wherein the aforementioned measurements are correlated to determine the quality of assembly of the tool parts.

It is an additional object of the present invention to provide a clamping device which can be easily and quickly attached to and disconnected from the tool parts being assembled.

It is an additional object of the present invention to provide a two-part clamping device which is attached to one of the tool parts, and by means of which strain measurements are made as a result of movement between the two clamp parts.

It is an additional object of the present invention to provide a clamping device which has the capability of being quickly transferred from one tool assembly to another.

It is an additional object of the present invention to provide a highly portable clamping device which is capable of providing two or more strain readings at a given time.

It is an additional object of the present invention to provide a method, system and device which is easier to attach to a tool assembly, easier to use, highly effective and accurate, and minimal in cost.

The above and other objects, as will hereinafter appear, and the nature of the invention will be more clearly understood by reference to the following detailed description, the appended claims, and the accompanying drawings.

BEST MODE FOR CARRYING OUT THE INVENTION

The method, system and device of the present invention will now be described in more detail with reference to the various drawings.

Figure 1:
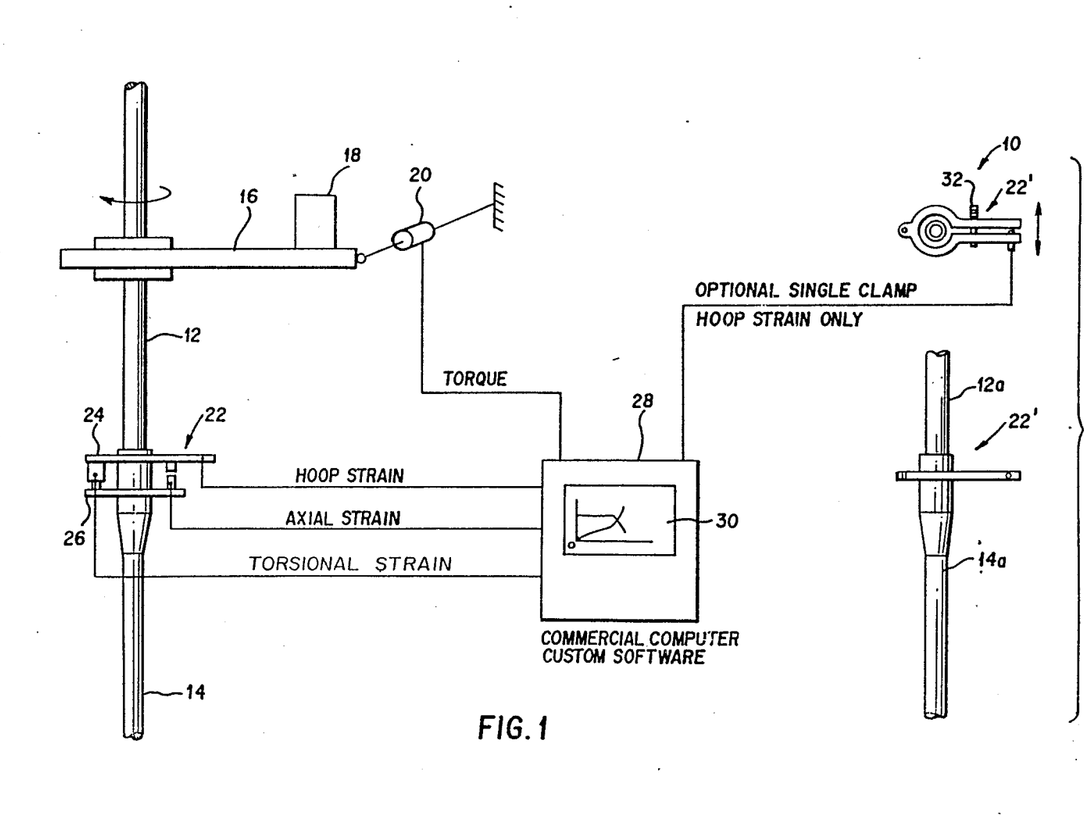
FIG. 1 is a diagrammatic representation of the measuring system and device of the present invention used with a typical oil well tubing assembly.
Figure 2:
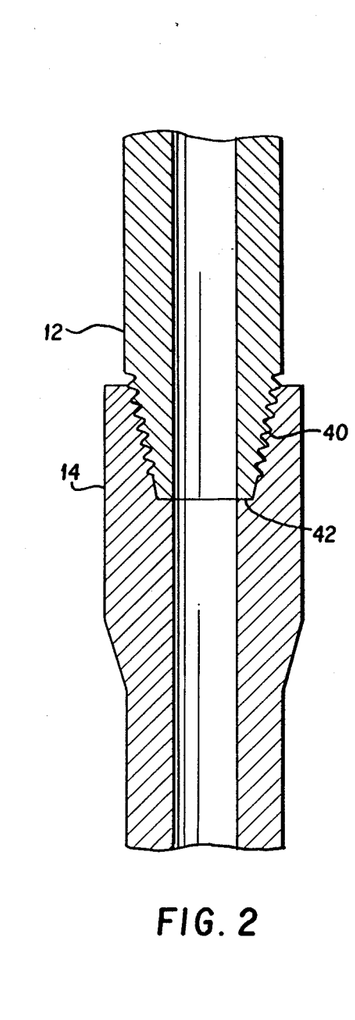
FIG. 2 is a cross-sectional side view of a typical oil well tubing connection with which the system and device of the present invention are used.

FIG. 1 is a diagrammatic representation of the system and device of the present invention, while FIG. 2 is a cross-sectional side view of a typical oil well tubing connection with which the method, system and device of the present invention are employed.

Referring to FIG. 1, the system 10 comprises a power tong 16 with associated hydraulic motor 18, the power tong 16 being connected to the pin 12 of a drill pipe section, and a clamping device 22 connected to the box 14 of the drill pipe section. The clamping device 22 comprises a top clamp 24 and a bottom clamp 26, from which measurements of hoop strain, axial strain and torsional strain are derived, such strain measurements being provided to a computer 28 having a display 30. A load cell 20 connected to power tong 16 provides a torque measurement to the computer 28.

In the righthand portion of FIG. 1, an optional, single-clamp embodiment for measuring hoop strain only is shown. A single-part clamp 22' (shown in plan and elevation) is connected to the box 14a of a drill pipe, the single-part clamp 22' being provided with a spring clamp 32 as shown. The hoop strain measurement is provided to the computer 28.

Referring to FIG. 2, which is a cross-sectional side view of a typical oil well tubing connection, the typical connection is seen to comprise a pin 12 rotatably inserted into a box 14, the pin 12 and box 14 being interconnected by engagement of an external tapered thread 40 (a generic composite thread) on pin 12 with a corresponding internal thread in box 14. Reference numeral 42 indicates a torque shoulder typically provided in such connections in order to insure proper tightening of pin 12 within box 14 so as to achieve an appropriate sealing effect. More specifically, the torque shoulder 42 applies additional stress and sealing surface to the interconnection of pin 12 and box 14. Whereas torque is the result of both thread interference (a tapered thread) and torque shoulders and seals, a typical thread may require fifty percent of the total torque applied to the shoulder during assembly, as is well-known to those of skill in the art.

Figure 3:
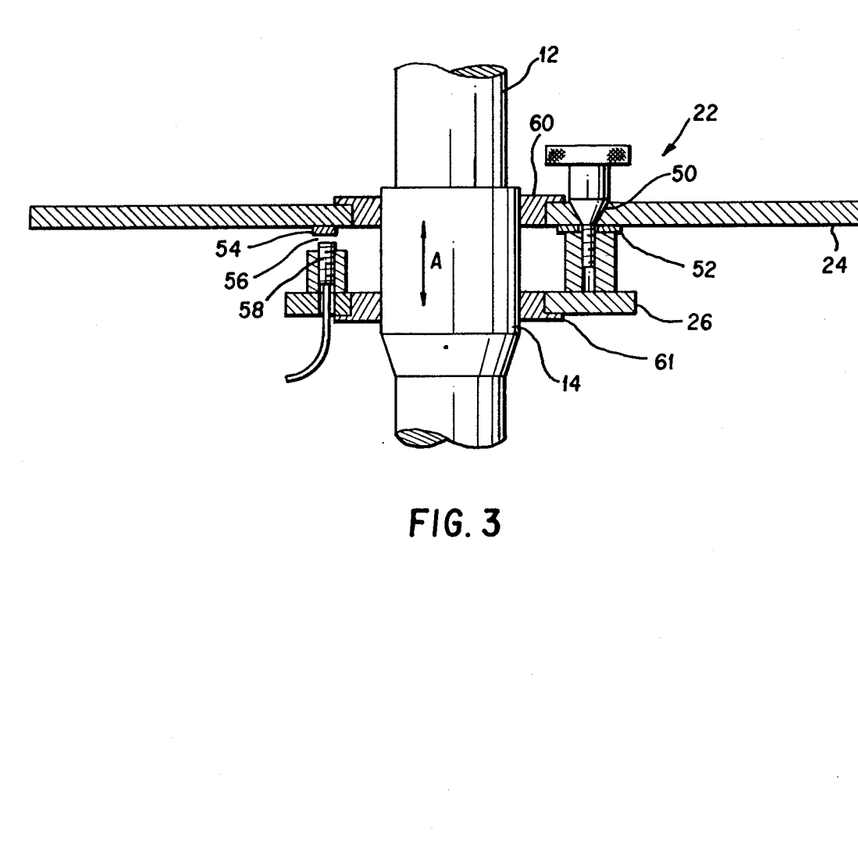
FIG. 3 is a side view in partial section of the measuring or clamping device of the present invention.
Figure 4A:
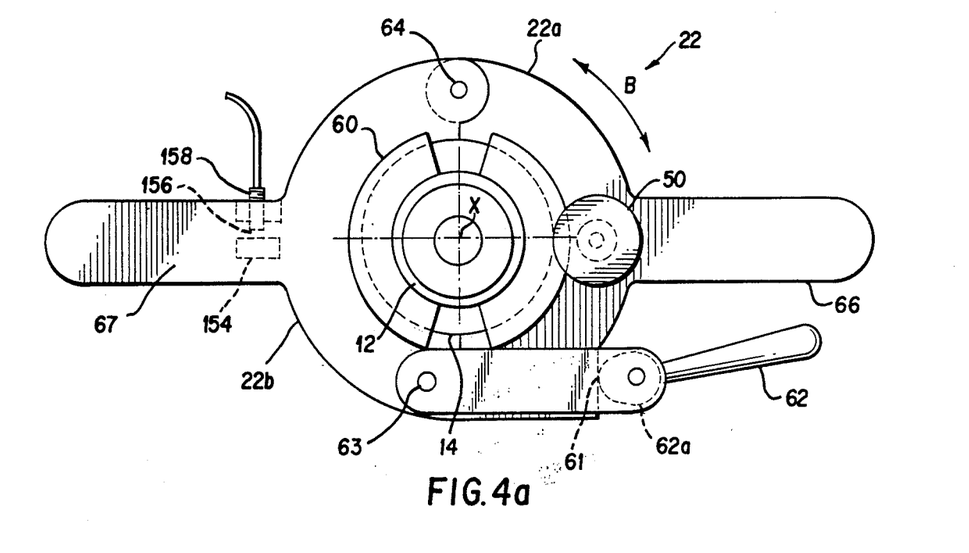
FIGS. 4A and 4B are top views of the device of FIG. 3.
Figure 4B:
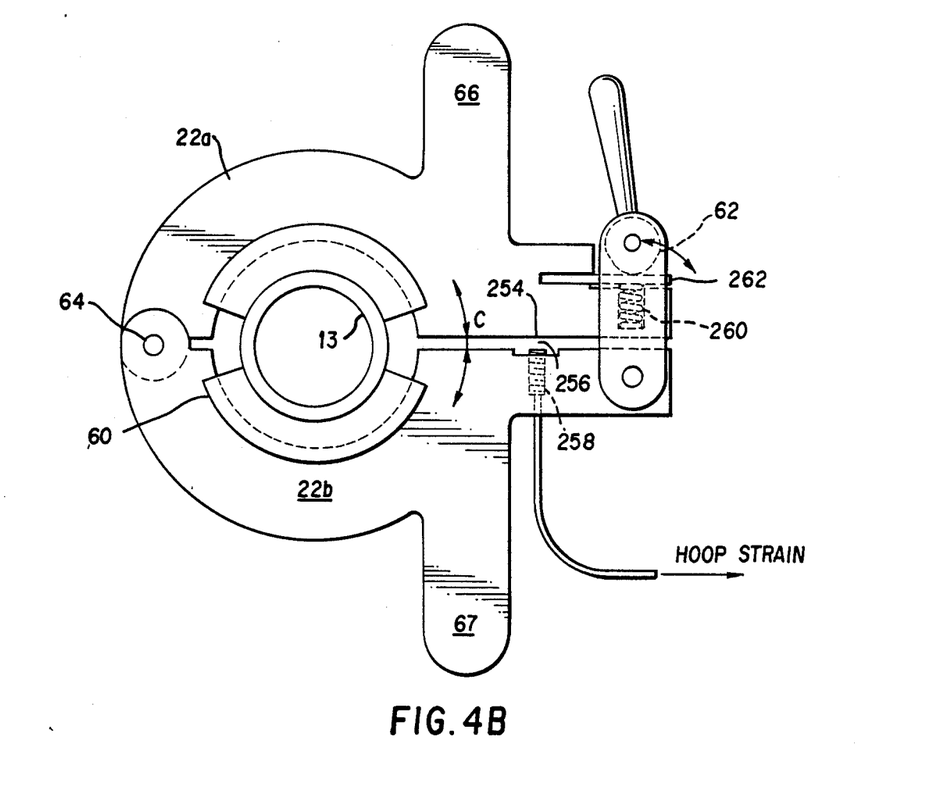

FIG. 3 is a side view in partial section, and FIGS. 4A and 4B are top views, of the clamping device of the present invention. As seen therein, the clamping device 22 comprises the following elements: top clamp 24, bottom clamp 26, tapered screw (or cam) 50, spacer 52, targets 54, 154 and 254, sensors 58, 158 and 258, inserts 60 and 61, cam latch 62 (both top and bottom, although only the top is shown), hinge 64, handles 66 and 67, spring 260 and spring pad 262.

Targets 54, 154 and 254 are flat pieces of iron set at approximately a right angle with respect to sensors 58, 158 and 258, respectively. Although targets 54, 154 and 254 do not necessarily form an integrated component or part, they could be a part of the same body of metal.

Air gap 56 is formed between target 54 and sensor 58, while air gap 156 is formed between target 154 and sensor 158, and air gap 256 is formed between target 254 and sensor 258. Thus, when there is movement between the top clamp 24 and bottom clamp 26, there is a variation in the linear dimension of air gaps 56 and/or 156 and/or 256, and the sensors 58, 158 and 258 measure the newly modified linear distance across air gaps 56, 156 and 256, respectively (that is, between target 54 and sensor 58 with respect to the air gap 56, between target 154 and sensor 158 with respect to air gap 156, and between target 254 and sensor 258 with respect to air gap 256). Preferably, sensors 58, 158 and 258 comprise conventional sensor devices such as the sensor device manufactured by Electro Corporation.

Alternatively, sensors 58, 158 and 258 in FIGS. 3, 4A and 4B, respectively, can be implemented by conventional transducing systems such as the EMDT transducing system in which a very low-level radio frequency field is generated in front of the sensor. Such a field generates eddy currents in any metal target (such as targets 54, 154 or 254) which the field intercepts, and these eddy currents remove energy from the field so as to reduce the apparent Q (quality factor) of the sensor. As is well-known to those of skill in the art, in such a conventional arrangement, the reduction in Q is translated into a signal output that is proportional to the distance between the sensor 58, 158, or 258 and the target 54, 154 or 254. Further information relative to this concept can be found in U.S. Pat. No. 4,068,189.

Inserts 60 and 61 are parts of the top clamp 24 and bottom clamp 26, respectively. They are used to adapt the clamping device 22 for use with pipes of different size, the inserts 60 and 61 enabling the user to quickly transfer the clamping device 22 from one pipe size to another.

With respect to use and operation of the invention, the clamping device 22 is best attached to the box 14 just before the power tong 16 is applied to the pin 12. The clamping device 22 is attached to the box 14 at a position determined to give the desired readings, the choice of this position being obvious to a person of skill in the art.

Further referring to FIGS. 3, 4A and 4B, once the clamping device 22 is positioned on the box 14, cam latches (top and bottom) 62 are set to their latch positions. Tapered screw 50 is loosened, and the spacer 52 is removed. Removal of spacer 52 removes any firm contact between top clamp 24 and bottom clamp 26 other than their common contact with the box 14. It should be noted that it is not essential to use or remove spacer 52 for use of the clamping device 22 to obtain torsional or torque readings because only twisting movement is involved in that operation.

After attaching clamping device 22 to box 14, power tong 16 is attached to pin 12, the pipe is rotated, and the thread 40 is assembled. Depending on particular thread needs, the entire assembly may be subjected to data measurement and recording by the computer 28 (FIG. 1) or, as in most cases, it can be predetermined that a certain threshold torque be reached before the computer 28 records the thread makeup.

Power tong 16 is stopped when a predetermined level of torque is reached. The computer-generated graphics on display 30 are then observed by a trained operator to determine if the thread assembly is good or bad. If a bad assembly is detected, the entire connection is disassembled. However, if a good assembly is detected, power tong 16 and clamping device 22 are removed, and the next connection is prepared.

Further referring to FIG. 3, the top clamp 24 and bottom clamp 26 are held apart by spacer 52 and tapered screw 50. After attachment of the clamp 22 to the box 14, the screw 50 is loosened and the spacer may be removed, allowing the top clamp 24 and bottom clamp 26 to be free of each other. However, in cases where it is known that the clamps will pull apart or twist, removal of the spacer 52 may not be necessary. That is to say, removal of spacer 52 allows the top clamp 24 and bottom clamp 26 to come together without touching each other. When the top clamp 24 and bottom clamp 26 are being twisted (one in the clockwise direction and the other in the counter-clockwise direction) for a reading of torsional strain, no spacer 52 or removal of spacer 52 is necessary. It is only necessary for the tapered screw 50 (which acts as a clamping screw) to be loosened to allow for free rotation of the top clamp 24 and bottom clamp 26.

For quick attachment of the clamping device 22, it is important to have the doors 22a and bodies 22b in the correct position. With respect to the latter statement, referring to FIG. 4A, the clamping device 22 is seen to comprise right semicircular portions (top and bottom) defining doors 22a and left semi-circular portions (top and bottom) defining bodies 22b. Each door 22a is connected to a respective body 22b at a hinge joint 64 so that the door 22a can swing in a counter-clockwise direction about hinge 64 and away from body 22b. During the clamping operation, once the bodies 22b are positioned around box 14, doors 22a are rotated in a clockwise direction around hinge 64 so as to close on bodies 22b, and the entire assembly is locked in place by counter-clockwise rotation of cam latches 62 around pivot 63, the cam latches 62 arriving at a locking position wherein an interior portion 62a of latch 62 abuts against a flat end portion 61 of the door 22a.

Thus, in order to facilitate attachment of clamping device 22 to box 14, and in order to permit the clamping operation to be carried out as quickly as possible, all parts including doors 22a and bodies 22b should be in an optimum open position in order to allow easy placement of clamping device 22 on the box 14 of the pipe. Preferably, this is accomplished by means of the use of various stops and springs (not shown), which can be designed into the clamping device 22 at appropriate places, as would be obvious to a person of skill in the art.

In addition, for quick completion of the clamping operation, doors 22a should swing together by attaching them together with flexible material. That is to say, if top and bottom doors 22a are loosely connected to each other by some flexible material, such as fabric belting, springs, loose pins, or the like, when the top door 22a is closed, the bottom door 22a will also close in unison therewith, and the clamping operation will be speeded up accordingly. It should be noted that the loose connection of doors 22a in this manner will not and should not interfere with the strain readings derived by means of the clamping device 22.

Further referring to FIG. 4A, it should be noted that, preferably, tapered screw 50 is best placed on the same side of clamping device 22 as sensor 158 and target 154 are located, that is, on the side defining body 22b. In FIG. 4A, the tapered screw 50 is shown on door 22a merely for the sake of clarity in viewing and interpreting FIG. 4A.

Handles 66 and 67 of clamping device are provided as portions which the operator may grip while clamping device 22 is being attached to or removed from the box 14.

In FIG. 3, the target 54 and sensor 58, with the air gap 56 therebetween, are employed to measure axial strain movement of the box 14 relative to the torque being applied by pin 12. That is to say, as the connection defined by pin 12 and box 14 is subjected to axial strain, movement indicated by the double-headed arrow A in FIG. 3 take place, resulting in a modification of air gap 56. This modification in the air gap 56 is detected by sensor 58 operating in conjunction with target 54, and the axial strain to which the connection is subjected is measured by computer 28 in response to the signal received from sensor 58.

In FIG. 4A, the target 154 and sensor 158, with the air gap 156 therebetween, are employed to measure torsional strain movement of the box 14 relative to pin 12. In operation, when pin 12 is rotated and torqued into box 14, some twisting of box 14 will occur in some portion relative to the torque being applied. At the time that seals or shoulders (torque shoulder 42 of FIG. 2) are contacted, the amount of change in the twist of box 14, corresponding to torsional strain movement defined by the double-headed arrow B appearing in FIG. 4A, is recorded by computer 28 as a result of a signal from sensor 158. More specifically, the torsional strain movement results in modification of air gap 156, this modification in air gap 156 is detected by sensor 158 (operating in combination with target 154), and sensor 158 provides a corresponding signal to the computer 28. These strain or twist changes, when compared with the torque curve—derived by load cell 20 (FIG. 1) in a conventional manner—enable a decision to be made as to the quality of the connection.

Further referring to FIG. 4A, it should be noted that, the further the sensor 158 is placed from the center axis of the pipe (indicated by reference character X), the more sensitivity and amplification will be achieved by using the device of the present invention.

Referring to FIGS. 3, 4A and 4B, the inserts 60 and 61 are provided in order to transfer the clamping device 22 easily from one pipe of one size to another pipe of another size. Inserts 60 and 61 are, preferably, made of metal such as steel, aluminum, or any other suitable material. Inserts 60 and 61 are attached to the clamping device 22 by a bolt or bolts (not shown) passing through the flange part of inserts 60 and 61. Inserts 60 and 61 are so designed as to allow one clamping device 22 to fit several pipe sizes by merely changing the sizes of inserts 60 and 61.

In FIG. 4B, the target 254 and sensor 258, with the air gap 256 therebetween, are employed to measure hoop strain movement (designated by the double-headed arrow C) of the box 14 relative to pin 12. In operation, as the connection defined by pin 12 and box 14 is subjected to hoop strain, a change in the circumference of the pipe 13 takes place, and this change in the circumference results in a corresponding change in the distance between the target 254 and the sensor 258. In particular, the arrangement of the spring 260 and the spring pad 262 permits the air gap 256, or the dimension between the target 254 and the sensor 258, to change, and detection of this change in dimension results in measurement of the change in circumference of the pipe 13. In this manner, the hoop strain sensor 258 provides an electrical signal corresponding to hoop strain, as indicated in FIG. 4B.

Figure 5:
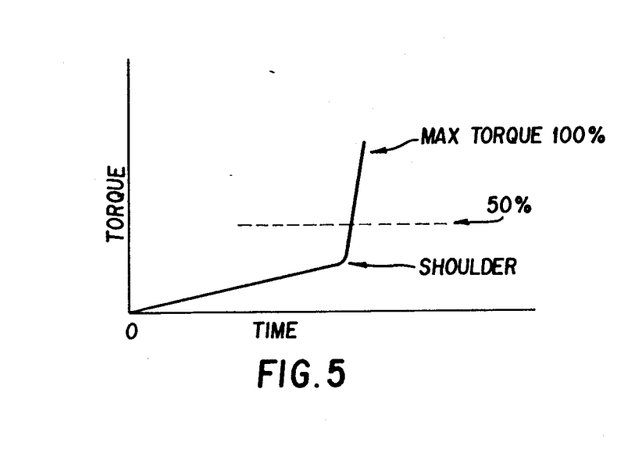
FIGS. 5, 6 and 7 are torque-time plots used to show the advantage of the present invention with respect to arrangements of the prior art (which measured torque only).
Figure 6:
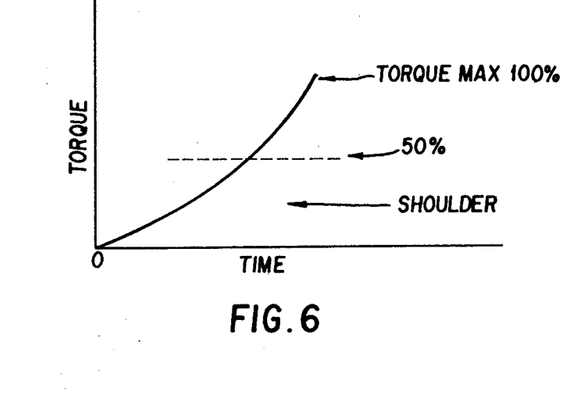
Figure 7:
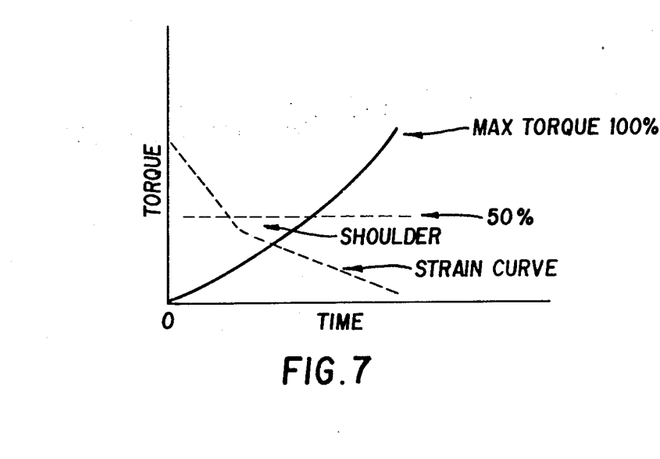

FIGS. 5, 6 and 7 are torque-time plots used to show the advantage of the present invention with respect to arrangements of the prior art (which measured torque only). More specifically, FIG. 5 is a time-torque plot in which the encountering of the shoulder 42 (FIG. 2) during the assembly of a pin 12 and box 14 is indicated by a rapid change in the torque curve, that is, a rapid increase in the slope of the torque curve. Under near perfect conditions of assembly, this "torque measurement only" technique has worked fairly well in the prior art. However, under less than perfect conditions, the torque-time curve during assembly of pin 12 and box 14 will be as appears in FIG. 6, and there will be no abrupt increase in the slope of the torque curve, so that encountering of the shoulder during assembly is not detected.

As shown in FIG. 7, the present invention is based on the fact that, whereas the torque-time curve will not work under the conditions of FIG. 6, the strain curve shown in FIG. 7 (as a dotted line) will enable the user to detect encountering of the shoulder 42 during assembly of pin 12 and box 14 (FIG. 2).

Figure 8:
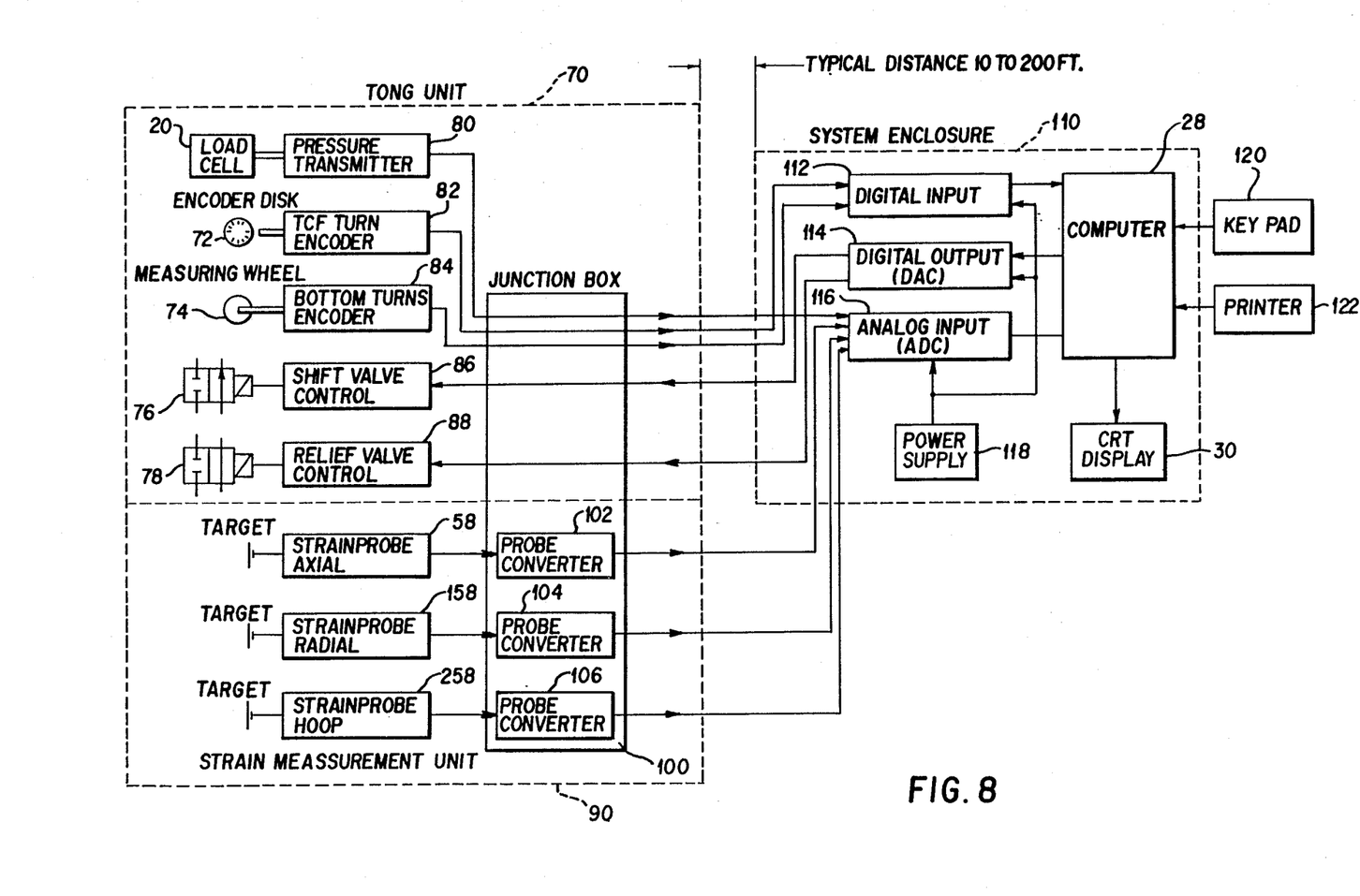
FIG. 8 is a block diagram of the system of the present invention.

FIG. 8 is a block diagram of the system of the present invention. As seen therein, the system basically comprises a tong unit 70, a strain measurement unit 90, a junction box 100, and a system enclosure 110 to which are connected a keypad 120 and a printer 122.

The system enclosure 110 comprises: computer 28 (which can be any suitable computer, such as a personal computer); cathode ray tube display (CRT) 30; digital input device 112, serving as an interface for receiving digital data and providing same to the computer 28; digital output device 114, serving as an interface and digital-to-analog converter for receiving digital data from computer 28 and converting the digital data to analog form prior to provision of the analog signals to tong unit 70; analog input device 116, serving as an interface and analog-to-digital converter for receiving digital data from tong unit 70 and strain measurement unit 90 and converting the analog data to digital form prior to provision of the digital data to computer 28; and power supply 118.

Tong unit 70 comprises previously mentioned load cell 20 (see FIG. 1) which is connected to power tong 16 and is utilized to measure the torque applied to box 12 and pin 14, the torque measurement being provided by pressure transmitter 80 as an analog input to element 116. Pressure transmitter 80 is a conventional device, preferably a two-wire FMA gage, absolute pressure transmitter manufactured by SENSOTEC.

Tong unit 70 also comprises encoder disk 72 connected to box 12 and measuring wheel 74 connected to pin 14, disk 72 and wheel 74 being utilized to measure the number of revolutions through which the box 12 and pin 14 turn. The turn data are encoded by top turns encoder 82 and bottom turns encoder 84, respectively, and the encoded digital turns data are provided via digital input 112 to the personal computer 28. Computer 28 utilizes this turns data and timing data from its internal clock to compute the revolutions per minute (RPM's) of the pin 12 and box 14 during assembly.

Shift valve 76 and relief valve 78 are controlled by shift valve control circuit 86 and relief valve circuit 88, respectively, the latter control circuits responding to analog signals provided by digital output (DAC) device 114, device 114 receiving digital commands from computer 28. The shift valve 76 and the relief valve 78 are parts of the conventional hydraulic circuit (not shown)

of the conventional tong unit 70. Shift valve 76 hydraulically changes the speed of power tong 16 (FIG. 1), while relief valve 78 stops the power tong 16 when a predetermined torque value has been reached.

Preferably, shift valve 76 and relief valve 78 are implemented by a two-way, normally closed, poppet-type, pilot-operated, solenoid-actuated, cartridge-type, hydraulic directional control valve such as manufactured by Modular Controls.

As already discussed above, with reference to FIGS. 3, 4A and 4B, the strain probes 58, 158 and 258 operate in conjunction with their respective targets 54, 154 and 254 to generate signals which provide indications of the axial, torsional and hoop strain, respectively, to corresponding probe converters 102, 104 and 106, respectively. Strain probes 58, 158 and 258 produce outputs comprising a low-level radio frequency output corresponding to the values of axial, torsional and hoop strain, respectively, and converters 102, 104 and 106 convert the radio frequency outputs to analog signals, preferably having a voltage range of 2 to 10 volts.

The analog outputs of converters 102, 104 and 106 are provided to analog input (ADC) device 116, the latter converting these analog signals to digital form for provision as digital input data to the computer 28.

As indicated in FIG. 8, preferably, the input and output signals and data provided by and to the tong unit 70 and strain measurement unit 90 flow through a junction box 100.

Power supply 118 provides power for operation of each of the major elements within the system enclosure 110, including digital input device 112, digital output (DAC) device 114, and analog input (ADC) device 116.

Computer 28 can display the results of its data processing on either CRT display 30 or printer 122, and operator input data can be provided via keypad 120 to the computer 28.

To summarize the operation of the system of FIG. 8, the method or technique of the present invention involves the following steps:

(1) calculation of the revolutions per minute of the pin 12 and power tong 16 based on measurement of the turns through which the pin 12 pass by encoder disk 72 and top turns encoder 82 (the measuring wheel 74 and bottom turns encoder 84 are associated with the box 14, are only used under special conditions to measure the bottom pipe rotation, and are not used at the same time that the clamping device 22 is used for measurement of the various strain values);

(2) measurement of the torque imposed on the box 12 and pin 14 during initial engagement of box 12 and pin 14, and after engagement of the shoulder 42, such measurement being taken by the load cell 20 and pressure transmitter 80;

(3) measurement of axial strain between pin 12 and box 14, as measured by axial strain probe 58 and probe converter 102;

(4) measurement of torsional strain between pin 12 and box 14, as measured by torsional strain probe 158 and probe converter 102; and (5) measurement of hoop strain about the circumference of box 14 when maximum torque is imposed, such measurement being taken by hoop strain probe 258 and probe converter 106.

In actuality, it is possible for the inventive method, system and device to perform the function of detection of shoulder engagement by measurement of only one of the strains (hoop, axial or torsional). As mentioned earlier, in the case where hoop strain only is measured, a single-clamp arrangement as shown in the righthand portion of FIG. 1 can be employed.

Figure 9:
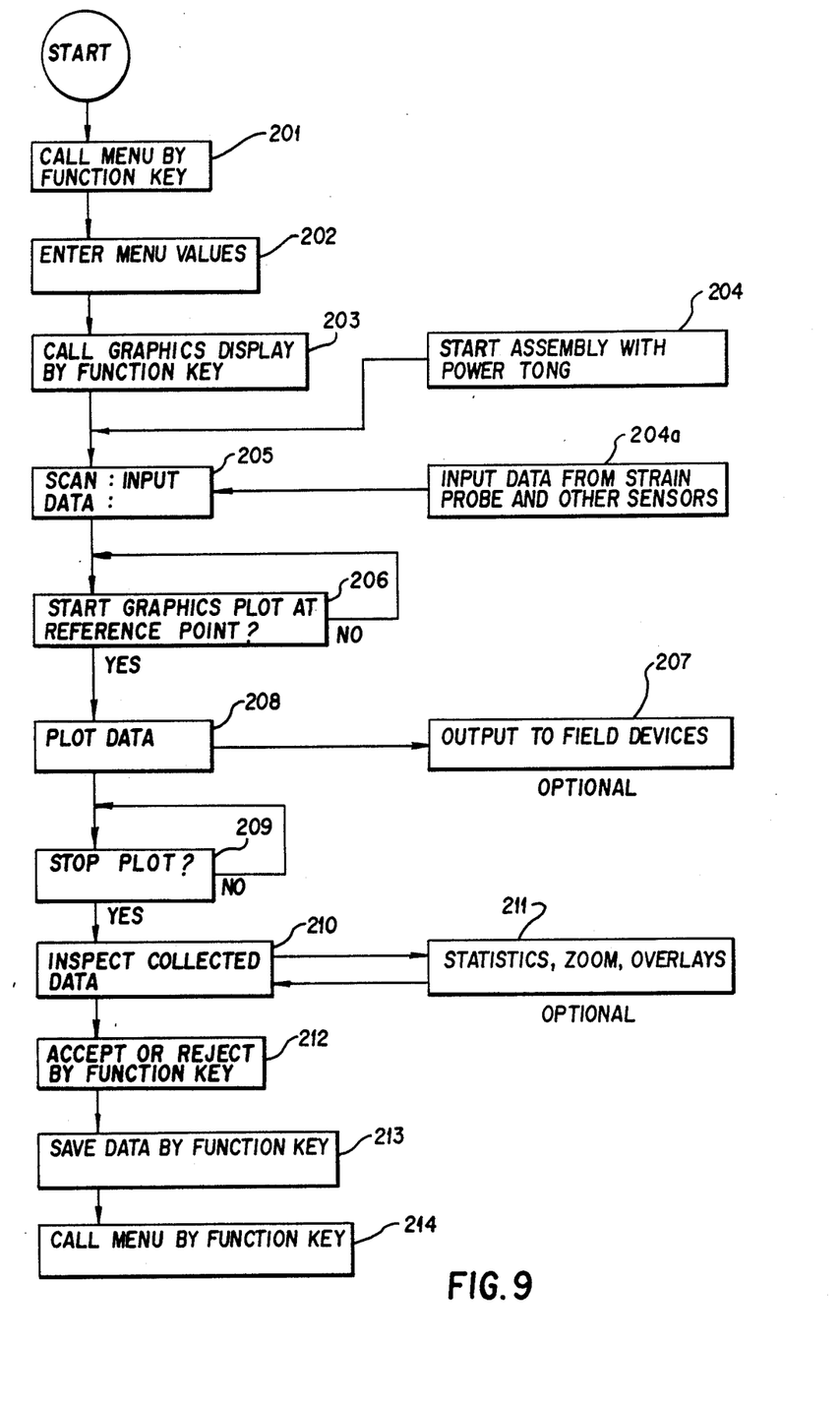
FIG. 9 is a flowchart of the computer operations performed by the system of the present invention.

FIG. 9 is a flowchart of the operations performed by computer 28 in processing the strain measurement data provided by strain measurement unit 90, as well as the torque and turns data provided by tong unit 70, as described above.

Referring to FIGS. 8 and 9, the operator commences operation of the system by using function keys on keypad 120 to display the menu on display 30 (block 201 of FIG. 9). The keypad 120 is then used to enter values requested on the menu (block 202 of FIG. 9) and relating to the current thread assembly.

Preferably, the operator is presented with the display of a menu containing some or all of the following parameters: job number, comment code, connection number, previous connection number, torque requested, torque scale, torque maximum, torque minimum, torque reference, torque shoulder line, torque shift, top turns maximum, top turns minimum, bottom turns maximum, bottom turns minimum, time scale, RPM (revolutions per minute) scale, strain input multiplier, stop plot, relief valve time delay, pulses per revolution top, pulses per revolution bottom, piston area, transducer maximum input, strain gauge maximum input, force device, and handle length. Of course, other menu settings may be introduced, as would be obvious to one of skill in the art. In any event, display of the menu permits the operator to alter default settings or enter new settings so as to "tailor" the parameters to the particular job being performed.

The operator then calls for graphics display by actuating another function key on keypad 120 (block 203 of FIG. 9). Then, assembly of pin 12 and box 14 (FIG. 1) commences by activation of the power tong 16 (block 204 of FIG. 9). Input data from strain probes 58, 158 and 258, as well as from the other sensors in tong unit 70, are then provided via junction box 100 and devices 112, 114 and 116, to the computer 28 (block 204a of FIG. 9). These input data are scanned by the computer 28 (block 205), and the program then makes a decision as to whether or not to start the graphics plot of the data vs. time at a given reference point (block 206 of FIG. 9). That is to say, a certain minimum torque must be reached before the computer 28 will plot and store information.

Presuming that a reference point is identified, the data are plotted and appear on display 30 (block 208 of FIG. 9). As an option, at the same time, the data can be provided as an output to field devices, that is, to suitable peripheral output devices located adjacent to the assembly site (block 207 of FIG. 9).

The program then determines whether or not the plotting is to be stopped and, once that determination is made, the collected data are inspected (blocks 209 and 210 of FIG. 9). The collected data are displayed on display 30 and, as another option, various statistical processing, zoom functions, or overlay functions can be carried out under the control of the operator (block 211 of FIG. 9). The latter statistical processing, zoom functions and overlay functions are optional software-implemented functions which can be incorporated into the program of computer 28, as is well within the capability of programmers of ordinary skill in the art.

Once the data are inspected, the operator can either accept or reject the data by operation of one or more function keys on keypad 120 (block 212 of FIG. 9). In addition, the operator can save the data by operation of a corresponding function key on keypad 120 (block 213 of FIG. 9). Finally, the operator can return to the menu by operation of another function key on keypad 120 (block 214 of FIG. 9), and the sequence can then be restarted at any time by entering of menu values (returning to block 202 of FIG. 9).

Figure 10:
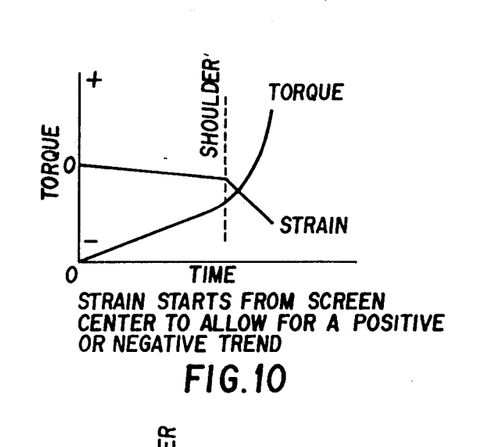
FIGS. 10, 11 and 12 are illustrations of graphical displays resulting from operation of the method, system and device of the present invention.
Figure 11:
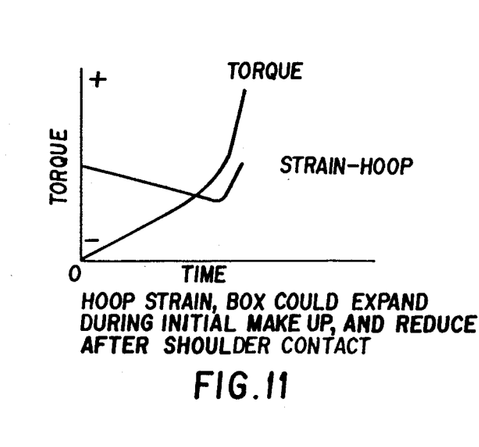
Figure 12:
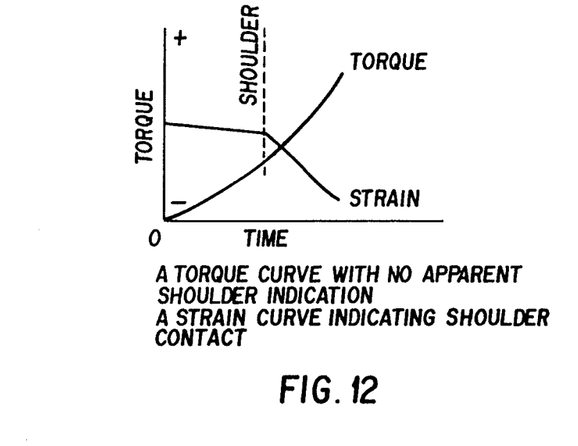

FIGS. 10, 11 and 12 are illustrations of the type of graphical plots which would appear on display 30 as a result of implementation of the plotting function by the program of computer 28 (block 208 of FIG. 9).

Referring to FIG. 10, which is intended to represent an axial strain plot for a thread with an external shoulder, whereas the torque curve does indicate to some extent the encountering of the shoulder 42 (FIG. 2) during assembly of the pin 12 and box 14, the strain curve provides a clearer indication of the shoulder, and it is that characteristic of the strain curve which constitutes the primary advantage of the method, system and device of the present invention.

Further referring to FIG. 10, it should be noted that, preferably, the computer 28 (FIG. 1) is programmed to start the strain plot at the center of the left side of the display screen 30 regardless of what the strain voltage input value is at the start of the plot. The changing input strain voltage is recorded as a positive or negative trend. Starting in the center of display screen 30 allows a positive and negative trend to be visualized. In addition, floating the input voltage to the screen center permits compensation for small errors in attaching the clamping device 22 to be provided. By way of example, in a range of 2 to 10 volts, an input of 4, 4.33, 5.1, 5.39 volts would always start at the center of display screen 30.

Referring to FIG. 11, which represents a hoop strain plot, the torque curve could again be said to indicate generally the encountering of the shoulder 42 during assembly of the pin 12 and box 14, but the plot of hoop strain is much more definitive in this regard.

It should be noted that each thread type and size has its own strain curve signature. This signature depends on what type of strain reading is taken (hoop, torsional or axial), as well as the position in which the clamping device 22 is placed.

Referring to FIG. 12, which is intended to represent an axial strain plot for a thread with an external shoulder, the torque curve gives no apparent indication of the encountering of the shoulder 42 during assembly of the pin 12 and box 14. However, the strain curve clearly indicates the encountering of the shoulder 42.

While preferred forms and arrangements have been shown in illustrating the invention, it is to be understood that various modifications can be made without departing from the spirit and scope of this disclosure.

We claim:

1. A method for determining the quality of assembly of tool parts, wherein a first tool part is assembled with a second tool part by rotatably inserting the first tool part into the second tool part to form a tool joint, the method comprising the steps of:
   (a) measuring at least one of the rates of rotation of the first and second tool parts and the torque imposed on the first and second tool parts to obtain a first set of data;
   (b) measuring at least two of axial strain, torsional strain and hoop strain imposed on the tool joint to obtain a second set of data; and
   (c) processing the first and second sets of data to determine the quality of assembly of the tool parts.

2. The method of claim 1, wherein step (b) comprises measuring axial strain and torsional strain.

3. The method of claim 1, wherein step (b) comprises measuring axial strain and hoop strain.

4. The method of claim 1, wherein step (b) comprises measuring torsional strain and hoop strain.

5. The method of claim 1, wherein step (b) comprises measuring axial strain, torsional strain and hoop strain.

6. A system for determining the quality of assembly of tool parts, wherein a first tool part is assembled with a second tool part by rotatably inserting the first tool part into the second tool part to form a tool joint, the system comprising:
   first means for measuring at least one of the rates of rotation of the first and second tool parts and the torque imposed on the first and second tool parts to obtain a first set of data;
   second means for measuring at least two of axial strain, torsional strain and hoop strain imposed on the tool joint to obtain a second set of data; and
   processing means for processing the first and second sets of data to determine the quality of assembly of the tool parts.

7. The system of claim 6, wherein said second means measures axial strain and torsional strain.

8. The system of claim 6, wherein said second means measures axial strain and hoop strain.

9. The system of claim 6, wherein said second means measures torsional strain and hoop strain.

10. The system of claim 6, wherein said second means measures axial strain, torsional strain and hoop strain.

11. The system of claim 6, wherein said processing means develops plots of strain versus time for said at least two of the axial strain, the torsional strain and the hoop strain.

12. The system of claim 11, further comprising display means responsive to said processing means for displaying the plots of strain versus time.

13. A clamping device for deriving data to determine the quality of assembly of tool parts, wherein a first tool part is assembled with a second tool part by rotatably inserting the first tool part into the second tool part to form a tool joint, said device comprising:
   connecting means for connecting said device to at least one of the first and second tool parts; and
   measuring means for measuring torsional strain and at least one of axial strain and hoop strain imposed on the tool joint to obtain the data to determine the quality of assembly of the tool parts;
   wherein said measuring means comprises a hoop strain probe.

14. The device of claim 13, wherein said connecting means comprises a spring clamp.

15. The device of claim 13, wherein said measuring means further comprises an axial strain probe and a torsional strain probe.

16. The device of claim 13, wherein said measuring means further comprises an axial strain probe.

17. The device of claim 13, wherein said measuring means further comprises a torsional strain probe.

18. The device of claim 12, further comprising at least one insert attachable to said at least one of said tool parts for adapting said device to tool parts of different sizes.

19. A clamping device for deriving data to determine the quality of assembly of tool parts, wherein a first tool part is assembled with a second tool part by rotatably inserting the first tool part into the second tool part to form a tool joint, said device comprising:

connecting means for connecting said device to at least one of the first and second tool parts; and measuring means for measuring torsional strain and at least one of axial strain and hoop strain imposed on the tool joint to obtain the data to determine the quality of assembly of the tool parts;

wherein said connecting means comprises a top clamp and a bottom clamp, and wherein said connecting means further comprises a tapered screw for connecting said top clamp to said bottom clamp.

20. The device of claim 19, wherein said connecting means further comprises a spacer insertable between said top clamp and said bottom clamp for maintaining a gap therebetween.

21. The device of claim 19, further comprising at least one insert attachable to said at least one of said tool parts for adapting said device to tool parts of different sizes.

22. A clamping device for deriving data to determine the quality of assembly of tool parts, wherein a first tool part is assembled with a second tool part by rotatably inserting the first tool part into the second tool part to form a tool joint, said device comprising:

connecting means for connecting said device to at least one of the first and second tool parts; and measuring means for measuring torsional strain and at least one of axial strain and hoop strain imposed on the tool joint to obtain the data to determine the quality of assembly of the tool parts;

wherein said measuring means comprises at least one sensor and at least one target disposed adjacent to said at least one sensor so as to form an air gap therebetween, and wherein said at least one sensor detects variation in a dimension of said air gap as said first tool part and said second tool part are assembled, said at least one sensor generating an electrical signal corresponding to the variation in the dimension of said air gap, thereby generating an electrical indication of the torsional strain and at least one of axial strain and hoop strain.

23. The device of claim 22, further comprising at least one insert attachable to said at least one of the first and second tool parts for adapting said device to tool parts of different sizes.

24. A method for determining the quality of assembly of tool parts, wherein a first tool part is assembled with a second tool part by rotatably inserting the first tool part into the second tool part to form a tool joint, the method comprising the steps of:

(a) measuring at least one of the rates of rotation of the first and second tool parts and the torque imposed on the first and second tool parts to obtain a first set of data;

(b) measuring torsional strain imposed on the tool joint to obtain a second set of data; and (c) processing the first and second sets of data to determine the quality of assembly of the tool parts.

25. A system for determining the quality of assembly of tool parts, wherein a first tool part is assembled with a second tool part by rotatably inserting the first tool part into the second tool part to form a tool joint, the system comprising:

first means for measuring at least one of the rates of rotation of the first and second tool parts and the torque imposed on the first and second tool parts to obtain a first set of data;

second means for measuring torsional strain imposed on the tool joint to obtain a second set of data; and processing means for processing the first and second sets of data to determine the quality of assembly of the tool parts.

26. The system of claim 25, wherein said processing means develops a plot of strain versus time for the torsional strain.

27. The system of claim 26, further comprising display means responsive to said processing means for displaying the plot of strain versus time.

28. A clamping device for deriving data to determine the quality of assembly of tool parts, wherein a first tool part is assembled with a second tool part by rotatably inserting the first tool part into the second tool part to form a tool joint, said device comprising:

connecting means for connecting said device to at least one of the first and second tool parts; and measuring means for measuring torsional strain imposed on the tool joint to obtain the data to determine the quality of assembly of the tool parts;

wherein said connecting means comprises a top clamp and a bottom clamp, and wherein said connecting means further comprises a tapered screw for connecting said top clamp to said bottom clamp.

29. The device of claim 28, wherein said connecting means further comprises a spacer insertable between said top clamp and said bottom clamp for maintaining a gap therebetween.

30. The device of claim 29, further comprising at least one insert attachable to said at least one of said tool parts for adapting said device to tool parts of different sizes.

31. The device of claim 28, further comprising at least one insert attachable to said at least one of said tool parts for adapting said device to tool parts of different sizes.

32. A clamping device for deriving data to determine the quality of assembly of tool parts, wherein a first tool part is assembled with a second tool part by rotatably inserting the first tool part into the second tool part to form a tool joint, said device comprising:

connecting means for connecting said device to at least one of the first and second tool parts; and measuring means for measuring torsional strain imposed on the tool joint to obtain the data to determine the quality of assembly of the tool parts;

wherein said measuring means comprises at least one sensor and at least one target disposed adjacent to said at least one sensor so as to form an air gap therebetween, and wherein said at least one sensor detects variation in a dimension of said air gap as said first tool part and said second tool part are assembled, said at least one sensor generating an electrical signal corresponding to the variation in the dimension of said air gap, thereby generating an electrical indication of the torsional strain.

33. A method for determining the quality of assembly of tool parts, wherein a first tool part is assembled with a second tool part by rotatably inserting the first tool part into the second tool part to form a tool joint, the method comprising the steps of:

(a) measuring at least one of the rates of rotation of the first and second tool parts and the torque imposed on the first and second tool parts to obtain a first set of data;

(b) measuring at least two of axial strain, torsional strain and hoop strain imposed on the tool joint to obtain a second set of data;

(c) providing a computer for receiving the first and second sets of data; and (d) processing the first and second sets of data in an automated fashion using the computer to determine the quality of assembly of the tool parts.

34. The method of claim 33, wherein step (b) comprises measuring axial strain and torsional strain.

35. The method of claim 33, wherein step (b) comprises measuring axial strain and hoop strain.

36. The method of claim 33, wherein step (b) comprises measuring torsional strain and hoop strain.

37. The method of claim 33, wherein step (b) comprises measuring axial strain, torsional strain and hoop strain.

38. A system for determining the quality of assembly of tool parts, wherein a first tool part is assembled with a second tool part by rotatably inserting the first tool part into the second tool part to form a tool joint, the system comprising:

first means for measuring at least one of the rates of rotation of the first and second tool parts and the torque imposed on the first and second tool parts to obtain a first set of data;

second means for measuring at least two of axial strain, torsional strain and hoop strain imposed on the tool joint to obtain a second set of data; and computer means for processing the first and second sets of data in an automated fashion to determine the quality of assembly of the tool parts.

39. The system of claim 38, wherein said second means measures axial strain and torsional strain.

40. The system of claim 38, wherein said second means measures axial strain and hoop strain.

41. The system of claim 38, wherein said second means measures torsional strain and hoop strain.

42. The system of claim 38, wherein said second means measures axial strain, torsional strain and hoop strain.

43. The system of claim 38, wherein said computer means comprises a plotter for developing a plot of strain versus time for said at least two of the axial strain, the torsional strain and the hoop strain.

44. The system of claim 43, further comprising display means connected to said computer means and responsive thereto for displaying the plot of strain versus time.

45. A system for determining the quality of assembly of tool parts, wherein a first tool part is assembled with a second tool part by rotatably inserting the first tool part into the second tool part to form a tool joint, the system comprising:

first means for measuring at least one of the rates of rotation of the first and second tool parts and the torque imposed on the first and second tool parts to obtain a first set of data;

second means for measuring at least one of axial strain, torsional strain and hoop strain imposed on the tool joint to obtain a second set of data; and processing means for processing the first and second sets of data to determine the quality of assembly of the tool parts;

wherein said processing means develops a plot of strain versus time for said at least one of the axial strain, the torsional strain and the hoop strain.

46. The system of claim 45, further comprising display means responsive to said processing means for displaying the plot of strain versus time.

47. A clamping device for deriving data to determine the quality of assembly of tool parts, wherein a first tool part is assembled with a second tool part by rotatably inserting the first tool part into the second tool part to form a tool joint, the device comprising:

connecting means for connecting said device to at least one of the first and second tool parts; and measuring means for measuring at least one of axial strain, torsional strain and hoop strain imposed on the tool joint to obtain the data to determine the quality of assembly of the tool parts;

wherein said connecting means comprises a top clamp and a bottom clamp; and wherein said connecting means further comprises a tapered screw for connecting said top clamp to said bottom clamp.

48. The device of claim 47, wherein said connecting means further comprises a spacer insertable between said top clamp and said bottom clamp for maintaining a gap therebetween.

49. A clamping device for deriving data to determine the quality of assembly of tool parts, wherein a first tool part is assembled with a second tool part by rotatably inserting the first tool part into the second tool part to form a tool joint, the device comprising:

connecting means for connecting said device to at least one of the first and second tool parts; and measuring means for measuring at least one of axial strain, torsional strain and hoop strain imposed on the tool joint to obtain the data to determine the quality of assembly of the tool parts;

wherein said measuring means comprises at least one sensor and at least one target disposed adjacent to said at least one sensor so as to form an air gap therebetween, and wherein said at least one sensor detects variation in a dimension of said air gaps as said first tool part and said second tool part are assembled, said at least one sensor generating an electrical signal corresponding to the variation in the dimension of said air gap, thereby generating an electrical indication of at least one of axial strain, torsional strain and hoop strain.

* * * * *